United States Patent
Kalhan (10) Patent No.: US 11,160,023 B2
(45) Date of Patent: Oct. 26, 2021

(54) TRANSMISSION OF WAKE-UP SIGNAL TO MOBILE DEVICES AT ALTERNATE CARRIER FREQUENCY

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 16/959,521

(22) PCT Filed: Dec. 3, 2018

(86) PCT No.: PCT/US2018/063626
§ 371 (c)(1),
(2) Date: Jul. 1, 2020

(87) PCT Pub. No.: WO2019/139691
PCT Pub. Date: Jul. 18, 2019

(65) Prior Publication Data
US 2021/0058863 A1    Feb. 25, 2021

Related U.S. Application Data (60) Provisional application No. 62/615,550, filed on Jan. 10, 2018, provisional application No. 62/615,558, filed on Jan. 10, 2018.

(51) Int. Cl.
*G08C 17/00* (2006.01)
*H04W 52/02* (2009.01)
(Continued)

(52) U.S. Cl.
CPC ......... *H04W 52/0229* (2013.01); *H04W 4/70* (2018.02); *H04W 56/005* (2013.01); *H04W 68/005* (2013.01)

(58) Field of Classification Search
CPC . H04W 52/0229; H04W 4/70; H04W 56/005; H04W 68/005
(Continued)

(56) References Cited

U.S. PATENT DOCUMENTS 6,236,860 B1 * 5/2001 Hagting .......... H04W 36/00835
455/436
7,069,025 B2 * 6/2006 Goren ..................... H04L 47/70
455/456.2
(Continued)

FOREIGN PATENT DOCUMENTS

JP    2007-300420 A    11/2007
JP    2014-120941 A    6/2014
(Continued)

OTHER PUBLICATIONS

Kouzayha, Nour, Zaher Dawy, and Jeffrey G Andrews; "Analysis of a Power Efficient Wake-up Soution for M2M Over Cellular Using Stochastic Geometry"; 2016 IEEE Global Communications Conference (GLOBECON); Dec. 31, 2016.
(Continued)

*Primary Examiner* — Mark G. Pannell (57) ABSTRACT

A Wake-Up Signal (WUS) is transmitted at a first carrier frequency and at first system timing to a communication device and a paging message is transmitted to the communication device at a second carrier frequency and at a second system timing where the WUS indicates whether the paging message will be transmitted to the communication device. The communication device awakes from sleep state (sleep mode) and receives a resynchronization signal transmitted at the first carrier frequency.

20 Claims, 4 Drawing Sheets

(51) Int. Cl.
*H04W 4/70* (2018.01)
*H04W 56/00* (2009.01)
*H04W 68/00* (2009.01)

(58) Field of Classification Search
USPC .......................................................... 370/311
See application file for complete search history.

(56) References Cited

U.S. PATENT DOCUMENTS

| | | | |
|---|---|---|---|
| 2007/0207841 A1* | 9/2007 | Amerga | H04W 52/287 |
| | | | 455/574 |
| 2009/0080569 A1* | 3/2009 | Han | H04L 27/2613 |
| | | | 375/316 |
| 2009/0176515 A1* | 7/2009 | Willey | H04W 68/025 |
| | | | 455/458 |
| 2009/0181701 A1* | 7/2009 | Willey | H04W 68/025 |
| | | | 455/458 |
| 2010/0214969 A1* | 8/2010 | Lamm | H04W 52/0216 |
| | | | 370/311 |
| 2011/0002281 A1* | 1/2011 | Terry | H04W 52/0216 |
| | | | 370/329 |
| 2011/0039553 A1* | 2/2011 | Willey | H04W 68/02 |
| | | | 455/426.1 |
| 2011/0199950 A1 | 8/2011 | Klingenbrunn et al. | |
| 2012/0289170 A1 | 11/2012 | Li et al. | |
| 2013/0059592 A1* | 3/2013 | Chakraborty | H04W 56/0015 |
| | | | 455/444 |
| 2014/0016621 A1* | 1/2014 | Zhang | G01S 5/06 |
| | | | 370/336 |
| 2015/0109981 A1 | 4/2015 | Patil et al. | |
| 2015/0223089 A1* | 8/2015 | Chakraborty | H04W 24/08 |
| | | | 370/252 |
| 2016/0105862 A1 | 4/2016 | Charbit et al. | |
| 2016/0128128 A1* | 5/2016 | Ang | H04W 52/0235 |
| | | | 370/311 |
| 2016/0302165 A1* | 10/2016 | Da | H04W 56/002 |
| 2019/0045481 A1* | 2/2019 | Sang | H04B 1/713 |
| 2019/0200296 A1* | 6/2019 | Liu | H04W 52/26 |

FOREIGN PATENT DOCUMENTS

| | | |
|---|---|---|
| WO | 2003/085855 A1 | 10/2003 |
| WO | 2010/079908 A2 | 7/2010 |
| WO | 2010/134133 A1 | 11/2010 |
| WO | 2017/026188 A1 | 2/2017 |

OTHER PUBLICATIONS

Ghosh, Chittabrata and Jonathan Segev; "Target Wake Time for MU Measurement Scheduling", doc.: IEEE 802.11-17/1128r0; IEEE Standards Association; Piscataway, NJ; Jul. 13, 2017.

* cited by examiner

TRANSMISSION OF WAKE-UP SIGNAL TO MOBILE DEVICES AT ALTERNATE CARRIER FREQUENCY

CLAIM OF PRIORITY

The present application claims priority to U.S. Provisional Application No. 62/615,550 filed on Jan. 10, 2018, and U.S. Provisional Application No. 62/615,558 filed on Jan. 10, 2018, and assigned to the assignee hereof.

FIELD

This invention generally relates to wireless communications and more particularly to transmission of wake-up signals to user equipment devices at an alternate carrier frequency.

BACKGROUND

In a wireless network, a user equipment (UE) device is required to maintain an accurate symbol timing synchronization with its serving base station. The network synchronization is needed for the communication device to correctly decode the downlink signals received from the serving base station. The communication device listens to the serving base station's synchronization signal to adjust the internal clock of the communication device to track the symbol and frame time boundaries.

In order to save power, the communication device periodically turns OFF its transceiver and enters a sleep state. The communication device periodically wakes up from the sleep state to check whether a page message was received from the serving base station. If the communication device receives a page, then the communication device remains ON to receive the subsequent control and data signals.

Obviously, the communication device reduces its battery-consumption the longer the communication device remains asleep. However, the communication device remaining in a long duration sleep state results in the communication device clock drifting away from the nominal timing value. Therefore, every time the communication device wakes up, the communication device must reacquire the symbol timing before checking the page message.

Typically, the communication device takes a longer time to resynchronize than the time required for the communication device to receive and decode the page message. This resynchronization time becomes a much larger overhead for the Machine-type-Communications (MTC) UE communication devices. For example, to achieve a long battery life (e.g., 10-15+ years), which is an important aspect for the MTC networks, the MTC devices have a much longer sleep-cycle.

In fact, the sleep-cycle of some MTC devices can be between several minutes and several hours. Such a long sleep results in much larger clock-drifts for the MTC UE communication device. In addition, the MTC devices may operate in deep coverage areas where the downlink received signal strength is very low. In extreme scenarios, the received signal strength at the MTC devices could be as low as Signal-to-noise ratio (SNR)=−14 dB.

Having a large clock-drift and receiving a signal at very low signal strength forces the MTC devices to take several hundreds of milliseconds to acquire the network timing upon waking up. The reason it takes such a long time to detect the correct timing is that an MTC device has to wait to receive and accumulate multiple repetitions of the synchronization signal, which the MTC device combines in order to achieve a higher SNR. For example, according to the existing MTC Long Term Evolution (LTE) standard, an MTC device would require approximately 80 Primary Synchronization Signal (PSS) or Secondary Synchronization Signal (SSS) subframes to acquire the network timing after waking up. With a PSS/SSS subframe transmitted every 5 ms, 80 PSS/SSS subframes=400 ms that are required for the MTC UE device to obtain resynchronization. After obtaining resynchronization, it only takes a couple of milliseconds for the MTC device to decode the Physical Downlink Control Channel (PDCCH) to check for a page message indication.

SUMMARY

A Wake-Up Signal (WUS) is transmitted at a first carrier frequency and at first system timing to a communication device and a paging message is transmitted to the communication device at a second carrier frequency and at a second system timing where the WUS indicates whether the paging message will be transmitted to the communication device. The communication device awakes from sleep state (sleep mode) and receives a resynchronization signal transmitted at the first carrier frequency. After acquiring synchronization and determining the first system timing, the communication device receives the WUS. If the WUS indicates a paging message will be sent, the communication device applies a system timing offset to the first system timing to acquire the second system timing to receive the paging message at the second system timing at the second carrier frequency in the second frequency band.

DETAILED DESCRIPTION

As discussed above, communication devices, such as a Machine-type-Communications (MTC) user equipment (UE) devices, enter a sleep state to save power. The communication devices must exit the sleep state to receive paging messages that alert the device of incoming communications from a communication network. During the time in the sleep state, clock drift can result in the mobile device losing system timing with a communication network. The required resynchronization process is relatively long. In addition, after acquiring synchronization, the device may have to wait for the paging occasion (PO) when the paging message will be transmitted. The device consumes power during the resynchronization process and while waiting for the PO. To reduce power consumption, a wake-up signal (WUS) indicating whether a paging message will be transmitted can be transmitted before the PO which allows the device to return to sleep state if no paging message will be transmitted. Since the WUS is typically a 1 bit or 2 bit message, the relative overhead of resynchronization is very large. In other words, the device must spend significant time and energy to receive a small message. Therefore, reducing the time and energy for resynchronization reduces power consumption and extends battery life.

For the examples discussed below, the communication device acquires a first system timing from a signal transmitted at a first frequency carrier before tuning to a second frequency carrier. If the mobile device receives a wake-up signal (WUS) transmitted at the first carrier frequency indicating a paging message will be transmitted, the mobile device tunes to the frequency in the second frequency band to receive the paging message. For the examples, the first carrier frequency is within a first frequency band allocated for a first communication technology and the second carrier frequency is within a second frequency band allocated for a second communication technology. There may be several advantages for sending the synchronizing signal and the wakeup signal at a different carrier or in a different frequency band from the frequency band used for transmitting the paging message. In some situations, the frequency band used for the synchronization and WUS may have better propagation characteristics resulting in a higher signal quality. The higher signal quality (e.g., higher SNR) may reduce the time required for the communication device to obtain synchronization and receive the WUS. Such a situation may occur where the first frequency band is lower than the second frequency band. For example, where the first frequency band is lower than the second frequency band, signals received within the first frequency band may be received with a higher signal-to-noise ratio (SNR) than signals received within the second frequency band due to a lower propagation loss. In other situations, a base station using the first frequency band for downlink signals may be in closer proximity to the communication device than the serving base station. Therefore, selecting the first base station to transmit the synchronization signal and WUS requires transmission over the first frequency band where the closer proximity of the first base station leads to easier reception by the communication device of the synchronization signals and WUS. The better signal quality results in a reduced time for resynchronization as compared to resynchronization at the second frequency band. In other situations, efficient management of communication resources may include transmitting the synchronization signal and WUS in a different frequency band. Receiving the synchronization signal and WUS in a different frequency band may facilitate other goals and other implementation advantages. Although frequency bands are different, the two frequency bands may overlap in some situations.

If a paging message is available, the communication device tunes to the appropriate carrier frequency in the second frequency band to receive the paging message. For the examples, a first system timing acquired from signals received in the first frequency band is used to determine the second system timing (e.g., frame/sub-frame timing and subframe boundaries) in the second frequency band alleviating the need for resynchronization for messages transmitted in the second frequency band such as the paging message. The first system timing differs from the second system timing by a timing offset. As discussed herein, the system timing refers to the location and boundaries of frames and subframes of transmitted signals. Although the signals transmitted in the two frequency bands may have a different structure, a reference can be established between the structures such that the second system timing can be determined is the first system timing is known and the timing offset is known. The timing offset is any correlation value or absolute value that allows the communication device to determine the system timing of the paging channel to receive the paging message without receiving synchronization signal in the second frequency band. In some situations, the timing offset may be a period of time indicating when the paging message will be sent relative to a reference transmitted in the first frequency band.

Figure 1:
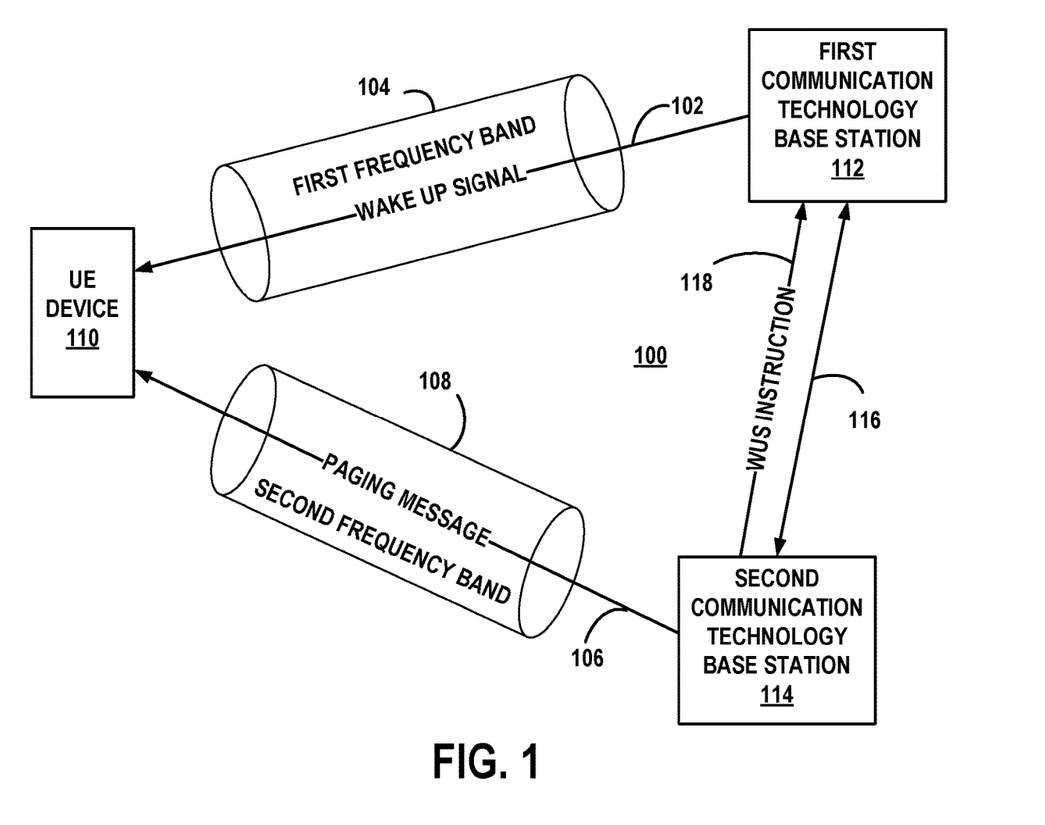
FIG. 1 is a block diagram of a communication system for an example where a wake-up signal (WUS) is transmitted at a first carrier frequency and a paging message is transmitted at a second carrier frequency to a user equipment (UE) communication device (communication device).

FIG. 1 is a block diagram of a communication system 100 for an example where a wake-up signal (WUS) 102 is transmitted at a first carrier frequency in a first frequency band 104 and the paging message 106 is transmitted at a second carrier frequency in a second frequency band 108 to a user equipment (UE) communication device 110 (communication device). The communication system 100 is part of a radio access network (not shown) that provides various wireless services to communication devices that are located within the respective service areas of the various base stations that are part of the radio access network. In the interest of clarity and brevity, the communication system 100 of FIG. 1 is shown as having only one first communication technology base station 112 and only one second communication technology base station 114. The communication system 100 may include any number of base stations using different communication technologies.

For the examples, the first frequency band 104 is allocated for a communication using a first communication technology and second frequency band 108 is allocated for wireless communication using a second communication technology. As discussed herein, a communication technology is a defined wireless technology where at least frequency, timing, messaging, and protocols are defined for wireless communication. Numerous other parameters may also be defined such as for example, power levels and network access procedures. The communication technologies may be defined by governmental agencies and communication standards. Some examples of communication technologies include technologies defined by revisions of the 3rd Generation Partnership Project Long Term Evolution (3GPP LTE) communication specification, revisions of the 5G New Radio communication specification, and IEEE 802.11 communication standards.

For the examples, the first communication technology is different from the second communication technology. In one example, the first communication technology is WiFi defined by IEEE 802.11 and the second communication technology is defined by a revision of the 3GPP communication specification. The WUS 102 is transmitted by a first communication technology base station 112 and the paging message 106 is transmitted by a second communication technology base station 114. A communication link 116 between the two base stations allows the second communication technology base station 114 to send an WUS instruction 118 to send the WUS 102 to the first communication technology base station 112 for transmission to the communication device 110. In some situations, the two base station 112,114 are co-located. The two base stations 112, 114 may also be implemented with a single hardware assembly. In other situations, a single controller may manage multiple radio heads to facilitate the functions of the two base stations 112, 114. Other combinations and configurations may also be possible. Therefore, various functions and operations of the blocks described with reference to the base stations 112, 114 may be implemented in any number of devices, circuits, or elements. Two or more of the functional blocks may be integrated in a single device, and the functions described as performed in any single device may be implemented over several devices.

The base stations 112, 114 may be referred to as transceiver stations, access points, eNodeBs or eNBs where the applied terms sometimes depend on the communication technology the devices support. In the case of implementations that utilize the 5G New Radio air interface, the base station is sometimes referred to as a gNB. The base stations 112, 114 communicate with the wireless user equipment communication devices by transmitting downlink signals to the communication devices and receiving uplink signals. Where the base stations are not part of the same hardware and are not co-located, the base stations 112, 114 may be connected to the network through a backhaul (not shown) in accordance with known techniques. The communication link 116, therefore, is an X2 link in some situations.

Figure 2:
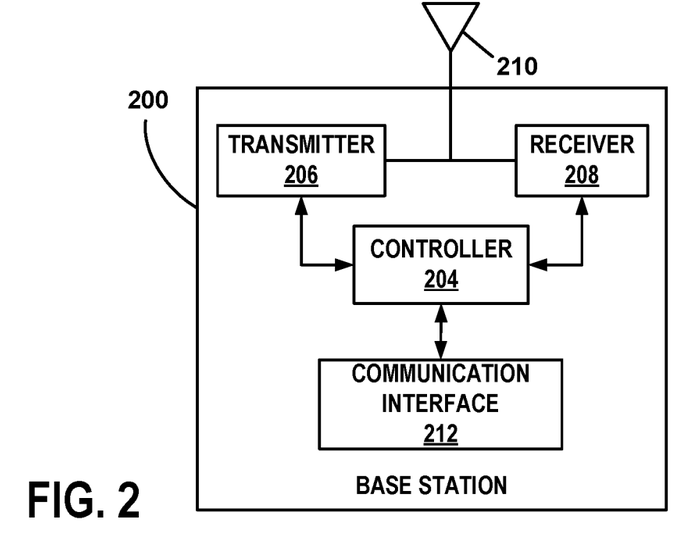
FIG. 2 is a block diagram of an example of a base station suitable for use as the first communication technology base station and the second communication technology base station.

FIG. 2 is a block diagram of an example of a base station 200 suitable for use as the first communication technology base station 112 and the second communication technology base station 114. The base station 200 includes a controller 204, transmitter 206, and receiver 208, as well as other electronics, hardware, and code. FIG. 2 depicts the functional blocks of the base station 200 where the specific operation of each block depends on the communication technology used by the particular base station communication. Therefore, the specific operation of the controller 204, transmitter 206, and receiver 208 in the base station 112 will differ from the operation of these components in the base station 214.

The base station 100 is any fixed, mobile, or portable equipment that performs the functions described herein. The various functions and operations of the blocks described with reference to the base stations 112, 114, 200 may be implemented in any number of devices, circuits, or elements. Two or more of the functional blocks may be integrated in a single device, and the functions described as performed in any single device may be implemented over several devices. The base station 200 may be a fixed device or apparatus that is installed at a particular location at the time of system deployment. Examples of such equipment include fixed base stations or fixed transceiver stations. In some situations, the base station 200 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 200 may be a portable device that is not fixed to any particular location. Accordingly, the base station 200 may be a portable user device such as a communication device in some circumstances.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2 perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the base station 200 in accordance with one of a plurality of modulation orders.

For the example, the base station 200 includes a communication interface 212 for transmitting and receiving messages with other base stations. The communication interface 212 may be connected to a backhaul or network enabling communication with other base stations. In some situations, the link 116 between the base stations 112, 114 may include at least some wireless portions. The communication interface 212, therefore, may include wireless communication functionality and may utilize some of the components of the transmitter 206 and/or receiver 208.

Figure 3:
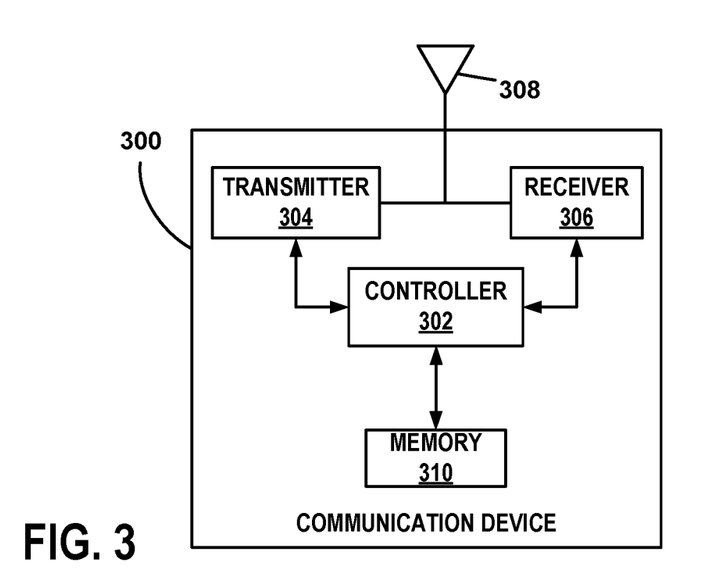
FIG. 3 is block diagram of an example of a UE communication device 300 suitable for use as the communication device of FIG. 1.

FIG. 3 is block diagram of an example of a UE communication device 300 suitable for use as the communication device 110 of FIG. 1. In some examples, the communication device 300 is any wireless communication device such as a mobile phone, a transceiver modem, a personal digital assistant (PDA), a tablet, or a smartphone. In other examples, the communication device 300 is a machine type communication (MTC) communication device. The communication device 300, (110), therefore is any fixed, mobile, or portable equipment that performs the functions described herein. The various functions and operations of the blocks described with reference to communication device 300 may be implemented in any number of devices, circuits, or elements. Two or more of the functional blocks may be integrated in a single device, and the functions described as performed in any single device may be implemented over several devices.

The communication device 300 includes at least a controller 302, a transmitter 304 and a receiver 306. The controller 302 includes any combination of hardware, software, and/or firmware for executing the functions described herein as well as facilitating the overall functionality of a communication device. An example of a suitable controller 302 includes code running on a microprocessor or processor arrangement connected to memory. The transmitter 304 includes electronics configured to transmit wireless signals. In some situations, the transmitter 304 may include multiple transmitters. The receiver 306 includes electronics configured to receive wireless signals. In some situations, the receiver 306 may include multiple receivers. The receiver 304 and transmitter 306 receive and transmit signals, respectively, through antenna 308. The antenna 308 may include separate transmit and receive antennas. In some circumstances, the antenna 308 may include multiple transmit and receive antennas.

The transmitter 304 and receiver 306 in the example of FIG. 3 perform radio frequency (RF) processing including modulation and demodulation. The receiver 304, therefore, may include components such as low noise amplifiers (LNAs) and filters. The transmitter 306 may include filters and amplifiers. Other components may include isolators, matching circuits, and other RF components. These components in combination or cooperation with other components perform the communication device functions. The required components may depend on the particular functionality required by the communication device.

The transmitter 306 includes a modulator (not shown), and the receiver 304 includes a demodulator (not shown). The modulator can apply any one of a plurality of modulation orders to modulate the signals to be transmitted as part of the uplink signals. The demodulator demodulates the downlink signals in accordance with one of a plurality of modulation orders.

During operation, the communication device 110 is served by the second base station 114 and receives signals from the first base station 112. Thus, upon receipt of the downlink signals, the communication device 110 demodulates the downlink signals, which yields encoded data packets that contain data pertaining to at least one of the wireless services that the serving base station 114 is providing to the communication device 110. The communication device 110 decodes the encoded data packets, using controller 302, to obtain the data.

The communication device includes a memory 310. In addition to storing other information related to the operation of the communication device 300, the memory is configured to store the timing offset. Where the timing offset is received from one of the base stations 112, 114, the controller 302 processes a message including the timing offset received through the receiver 306. The timing offset value is stored in memory 310. In one example, the timing offset is transmitted by the second base station 114 over a system information broadcast (SIB). The timing offset may also be determined by the communication device 300 based on downlink signals received from both base stations 112, 114. The receiver 306 receives at least one downlink signal from the first base station 112 and at least one downlink signal from the second base station 114 where the controller 302 determines the timing offset between the system timings of the two signals. The timing offset is then stored in memory 310. The memory 310 may be any suitable component or device In the example of FIG. 1, the communication device 110 wakes up from a sleep state to check for a WUS transmitted from the first base station 112. Upon waking, the communication device 110 warms up the receiver 306 and attempts to obtain resynchronization before checking a downlink channel for the WUS 102. In order to help the communication device 110 obtain resynchronization, the first base station 112 transmits, via its transmitter 206 and antenna 210, a resynchronization signal to communication device 110. In some situations, the second base station 114 may also transmit resynchronization signals and a WUS.

Figure 4:
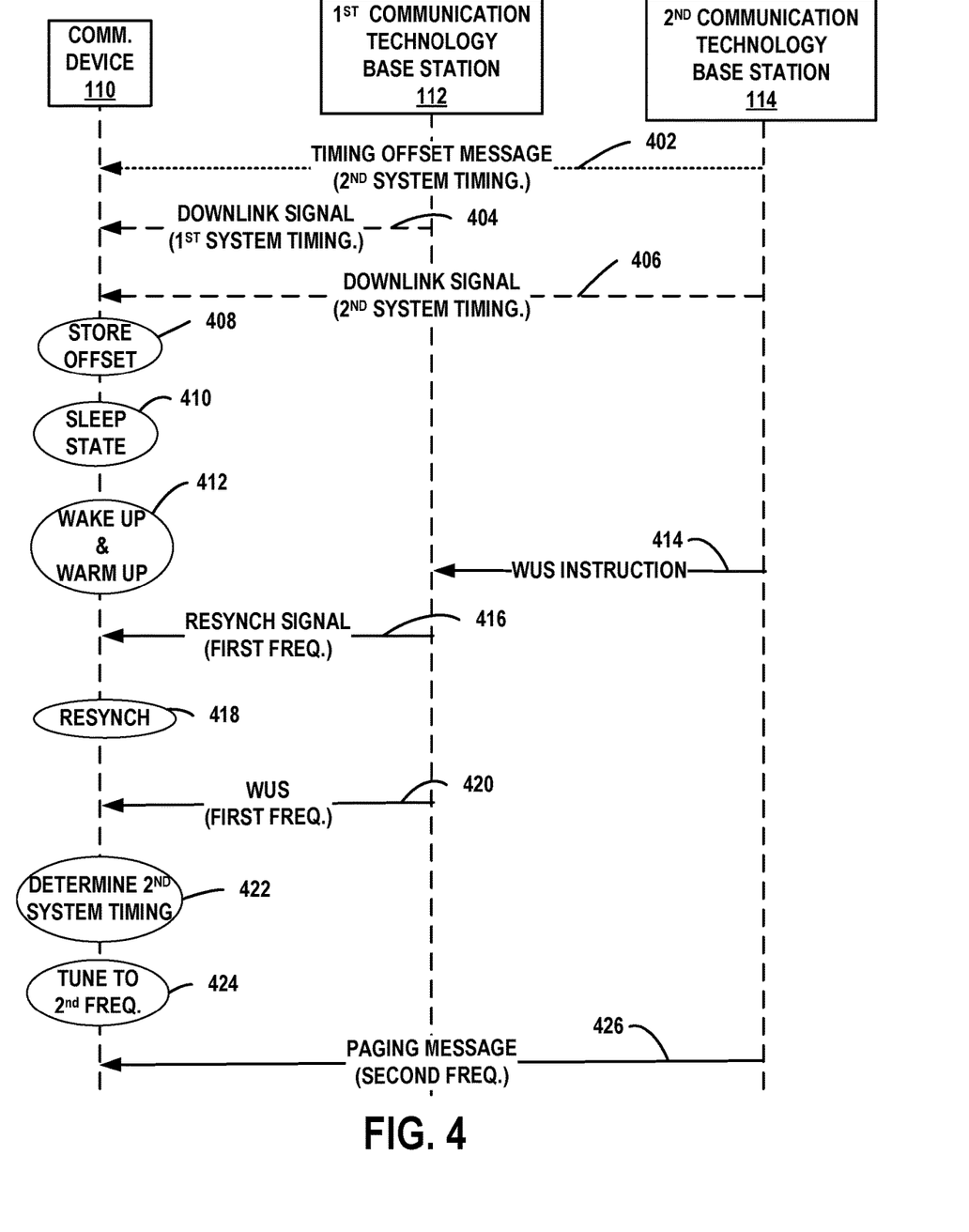
FIG. 4 is illustration of messaging and events for an example where the WUS is transmitted by the first communication technology base station and the paging message 106 is transmitted by the second communication technology base station.

FIG. 4 is illustration of messaging and events for an example where the WUS is transmitted by the first communication technology base station 112 and the paging message 106 is transmitted by the second communication technology base station 114.

At transmission 402, a timing offset message is sent by the second communication technology base station 114 to the communication device 110. At the time the message 402 is sent, the communication device is in a connected state and synchronized to the system timing of the second communication technology base station 114. The timing offset message 402 is indicative of the timing offset between the first system timing of the first communication technology base station 112 and the second communication technology base station 114. An example of a suitable technique for sending the timing offset message includes transmitting the timing offset message over SIB. In some situations, the timing offset message can be sent using dedicated messaging. The transmission 402 may be omitted in some circumstances or implementations. As a result, the communication device 110 may need to determine the system timing offset based on received downlink signals transmitted with the different system timings as discussed below with reference to transmission 404 and transmission 406. For FIG. 4, the arrow representing the timing offset message transmission 402 is shown as a dotted line to indicate that the transmission 402 may be omitted.

At transmission 404, the communication device 110 receives a downlink signal from the first communication technology base station 112. At the time of the transmission 404, the communication device is in a connected state and synchronized to the system timing of the first communication technology base station 112.

At transmission 406, the communication device 110 receives a downlink signal from the second communication technology base station 114. At the time of the transmission 406, the communication device is in a connected state and synchronized to the system timing of the second communication technology base station 114. The communication device 110 determines the system timing offset from the two received downlink signals. In situations where the system timing offset information has been received in a message such as in transmission 402, the communication device 110 may not determine the system timing offset from downlink signals. Therefore, the transmission 404, 406 are shown with dashed lines in FIG. 4 to indicate that the transmissions may not be needed to determine system timing offset.

At event 408, the system timing offset is stored in memory. Whether determined by the communication device 110 from received signals or received in a message, the communication device 110 stores the system timing offset in memory 310.

At event 410, the communication device 110 is in the sleep state. For the example, the communication device is served by the second communication technology base station 114. During the sleep state, the communication device 110 does not receive signals. Due to inaccuracies (drifting) of the internal clock, the communication device 110 may lose timing with the communication network during the sleep state. As a result, after exiting the sleep state, the communication device must resynchronize to the system timing of the second communication technology base station 114 before receiving paging messages.

At event 412, the communication device 110 wakes up and warms up receive circuits. The communication device exits the sleep state and performs a reactivation procedure which activates the receiver and prepares the receiver for receiving downlink signals.

At transmission 414, the second communication technology base station 114 sends a wake-up signal (WUS) instruction 118 to the first communication technology base station 112. The WUS instruction 118 instructs the first communication technology base station 112 to transmit a WUS 102 to the communication device 110. The second communication technology base station 114 determines that a paging message will be sent to the communication device 110 and that a WUS should be sent to the communication device 110. The first base station transmits a WUS instruction to the second base station either using X2 backhaul or wirelessly transmits a communication device identifier, such as the UE ID, and the resources used for transmitting the WUS signal. In an example, in addition to waking up the communication device, the WUS may implicitly inform the communication device of the resource in which the page will be transmitted (e.g., 1-bit WUS scrambled with a unique sequence which is a function of UE ID and/or paging resource).

At transmission 416, first communication technology base station 112 transmits resynchronization signals at the first frequency carrier in the first frequency band. The resynchronization signals may be any signals that allow the communication device 110 to obtain timing information. In some situations, the signals may include a sequence with special autocorrelation/correlation properties suitable for synchronization signals, such as the Zadoff-Chu (ZC) sequence, for example. The communication device receives the resynchronization signals and resynchronizes with the timing of first communication technology base station 112 at event 418.

At transmission 420, the first communication technology base station 112 transmits a WUS 102 to the communication device 110. The WUS 102 is transmitted at the first carrier frequency in the first frequency band 104. The communication device 110 tunes the receiver 306 to the first carrier frequency in the first frequency band 104 and receives the WUS 102. The communication device decodes the WUS and determines whether a paging message will be transmitted to the communication device. In some situations, a WUS is only transmitted when a paging message will be transmitted and the lack of a WUS indicates that no paging message will be transmitted.

At event 422, the communication device determines the second system timing. The communication device applies the system timing offset stored in memory to the first system timing to determine the second system timing.

At event 424, the communication device 110 tunes to the second carrier frequency in the second frequency band to receive the paging message. Where the WUS indicates a paging message is pending, the communication device tunes to the second carrier frequency to receive the paging message. The communication device applies the second system timing determined from the first system timing and the system timing offset to receive the paging message in the second frequency band 108.

At transmission 426, the second communication technology base station 114 transmits the paging message. Using the timing information determined from the resynchronization with the first base station 112, the communication device 110 receives the paging message.

Figure 5:
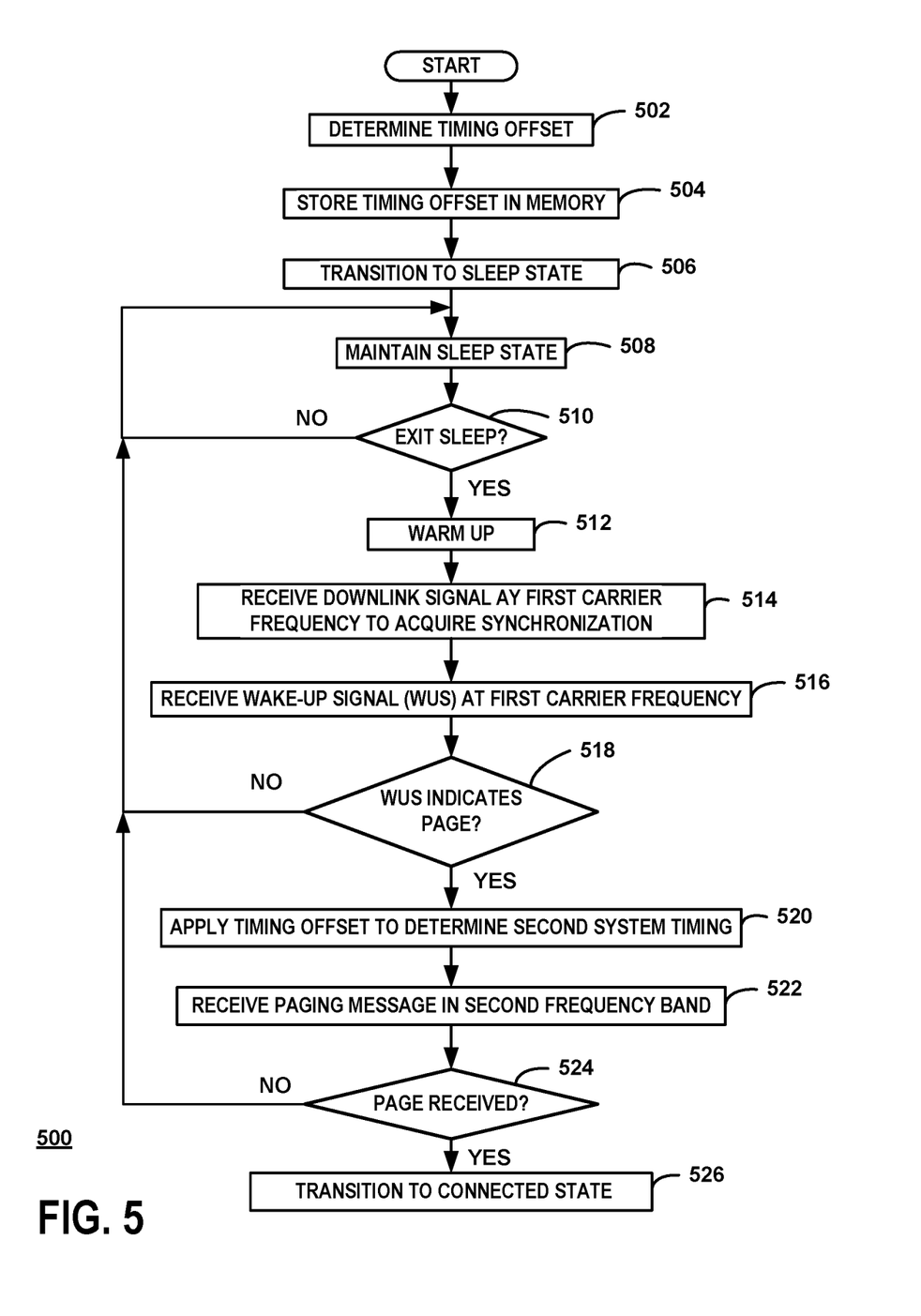
FIG. 5 is a flowchart of an example of a method of resynchronizing to a communication system after exiting a sleep state.

FIG. 5 is a flowchart of an example of a method of resynchronizing to a communication system after exiting a sleep state. For the example, the method is performed by a communication device such as the communication device 110 and the communication device 200. The steps of the method may be performed in a different order than described herein and shown in the example of FIG. 5. Furthermore, in some examples, one or more of the steps may be omitted. In other examples, one or more additional steps may be added. In some cases, multiple steps may be performed in parallel.

At step 502, the system timing offset is determined. As discussed above, the system timing offset may be received from the network in a message in some situations. In other situations, the communication device may determine the system timing offset by evaluating received downlink signals transmitted with the different system timings. The communication device is in a connected state at step 502.

At step 504, the system timing offset is stored in memory before transitioning to the sleep state at step 506. At step 506, the sleep state is maintained. The communication device places circuits in the appropriate state to reduce power consumption in accordance with known techniques.

At step 510, it is determined whether the communication device should exit the sleep state. In one example, it is determined whether a sleep time timer has expired. If the sleep state should be exited, the method continues to step 512. Otherwise, the method returns to step 508 where the communication device remains in the sleep state.

At step 512, a warm up procedure is executed. The communication device exits the sleep state and initializes and prepares the transceiver circuits for operation. The receiver, therefore, is prepared for receiving signals.

At step 514, a downlink signal at the first carrier frequency within the first frequency band is received. For the example, the first communication technology base station 112 transmits synchronization signals at the first carrier frequency within the first frequency band allocated for the first communication technology.

At step 516, a wake-up signal (WUS) 102 is received at the first carrier frequency within the first frequency band. The communication device is tuned to the first carrier frequency in the first frequency band and decodes the WUS.

At step 518, it is determined whether the WUS indicated that a page message will be transmitted. If the WUS indicates a page will be transmitted, the method proceeds to step 520. Otherwise, the method returns to step 508 where the communication device returns to the sleep state.

At step 520, the communication device determines the second system timing. The communication device applies the system timing offset stored in memory to the first system timing to determine the second system timing.

At step 522, the paging message is received in the second frequency band. The communication device uses the second system timing determined from the first system timing and the system timing offset to access the paging occasion and receive the paging message.

At step 524, it is determined if a page has been received for the communication device. The communication device decodes the paging message and determines if the communication device has been paged. If a page has been received, the method continues at step 526 where the communication device transitions to the connected state. Otherwise, the method returns to step 508 where the communication device enters the sleep state.

For the examples herein, the base stations 112, 114 using different communication technologies. In some situations, however, the base stations 112, 114 may use the same communication technology but may operate in different frequency bands and may not have the same system timing. As a result, the techniques discussed herein can be applied to situations where the two base stations use the same communication technology and do not have the same system timing.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   determining a system timing offset between a first system timing and a second system timing;
   after a sleep state, synchronizing to a downlink synchronization signal at a first carrier frequency to obtain the first system timing;
   receiving, at the first carrier frequency, a wake-up signal;
   if the wake-up signal indicates transmission of a paging message, applying the system timing offset to the first system timing to determine the second system timing and receiving the paging message at the second system timing at a second carrier frequency different from the first carrier frequency.

2. The method of claim 1, wherein determining the system timing offset comprises receiving a system timing offset message indicating the system timing offset.

3. The method of claim 2, wherein receiving system timing offset message comprises receiving the system timing offset message, prior to entering the sleep state, from a base station transmitting the paging message.

4. The method of claim 1, wherein determining the system timing offset comprises:
   receiving a first system downlink signal from a first base station using the first system timing;
   receiving a second system downlink signal from a second base station suing the second system timing;
   determining the system timing offset from the first system downlink signal and second system downlink signal;
   storing the system timing offset in memory prior to entering the sleep state; and
   retrieving the system timing offset from memory after exiting the sleep state.

5. The method of claim 1, wherein the first carrier frequency is within a first frequency band allocated for a first communication technology and the second carrier frequency is within a second frequency band allocated for a second communication technology.

6. The method of claim 1, wherein the first carrier frequency is lower than the second carrier frequency.

7. The method of claim 1, where the applying the system timing to receive the paging message comprises applying the system timing to receive the paging message without receiving a resynchronization signal in the second frequency band.

8. The method of claim 1, further comprising:
   returning to the sleep state if the paging message does not contain a page; and
   transitioning to a connected state if successfully decoding the paging message indicates that the paging message contains a page.

9. A wireless communication device comprising:
   a receiver configured to, after a sleep state, synchronize to a downlink signal at first carrier frequency to obtain a first system timing and configured to receive a wake-up signal at the first carrier frequency;
   a memory configured to store a system timing offset between a first system timing and a second system timing; and
   a controller configured to determine if the wake-up signal indicates a pending transmission of a paging message, the receiver configured to, in response to the controller determining that the wake-up signal indicates a pending transmission of the paging message, apply the system timing offset to the first system timing to receive the paging message at a second carrier frequency at the second system timing.

10. The wireless communication device of claim 9, wherein the first carrier frequency is within a first frequency band allocated for a first communication technology and the second carrier frequency is within a second frequency band allocated for a second communication technology.

11. The wireless communication device of claim 9, wherein the first carrier frequency is lower than the second carrier frequency.

12. The wireless communication device of claim 9, where the receiver is configured to apply the communication timing to receive the paging message without receiving a resynchronization signal in the second frequency band.

13. The wireless communication device of claim 9, wherein the controller is further configured to:
    return the wireless communication device to the sleep state if the paging message does not contain a page; and
    transition the wireless communication device to a connected state if the paging message contains a page.

14. A method comprising:
    transmitting a wake-up signal (WUS) within a first carrier frequency to a wireless communication device from a first base station, the WUS indicative of whether a paging message directed to the wireless communication device will be transmitted;
    transmitting a paging message to the wireless communication device at a second carrier frequency different from the first carrier frequency from a second base station; and
    transmitting a WUS instruction message from the second base station to the first base station, the WUS instruction instructing the first base station to transmit the WUS.

15. The method of claim 14, wherein the first carrier frequency is within a first frequency band allocated for a first communication technology and the second carrier frequency is within a second frequency band allocated a second communication technology.

16. The method of claim 14, wherein the WUS is received by the wireless communication device at a higher quality than a quality of the paging message as received by the wireless communication device.

17. The method of claim 14, wherein the first carrier frequency is lower than the second carrier frequency.

18. The method of claim 14, wherein the WUS instruction comprises a communication device identifier of the communication device and identifies communication resources for transmitting the WUS.

19. The method of claim 14, wherein transmitting the WUS instruction comprises transmitting the WUS instruction over an X2 communication link.

20. The method of claim 14, wherein transmitting the WUS instruction comprises transmitting the WUS instruction over a wireless communication link.

* * * * *